United States Patent [19]
Shimizu

[11] Patent Number: 5,344,683
[45] Date of Patent: Sep. 6, 1994

[54] OPTICAL INFORMATION RECORDING MEDIUM WITH PHASE GROOVES IN LAND PORTIONS OF INFORMATION RECORDING AREAS

[75] Inventor: Akihiko Shimizu, Yokohama, Japan

[73] Assignees: Ricoh Company, Ltd., Tokyo, Japan;

[21] Appl. No.: 44,645

[22] Filed: Apr. 8, 1993

Related U.S. Application Data

[63] Continuation-in-part of Ser. No. 603,467, Oct. 25, 1990, abandoned.

Foreign Application Priority Data

Oct. 27, 1989 [JP] Japan .................. 1-280420

[51] Int. Cl.⁵ .............................................. B32B 3/00
[52] U.S. Cl. ...................................... 428/64; 428/65; 428/913; 430/270; 430/945; 369/288; 346/76 L; 346/153.1
[58] Field of Search .................. 428/64, 65, 913; 430/270, 945; 346/76 L, 135.1; 369/288

[56] References Cited

U.S. PATENT DOCUMENTS

| | | | |
|---|---|---|---|
| 4,423,502 | 12/1983 | Dil | 369/275 |
| 4,947,384 | 8/1990 | Suzuki et al. | 369/279 |
| 4,956,214 | 9/1990 | Imataki et al. | 428/64 |

*Primary Examiner*—Patrick J. Ryan
*Assistant Examiner*—Elizabeth Evans
*Attorney, Agent, or Firm*—Cooper & Dunham

[57] ABSTRACT

An optical information recording medium for a land recording method in which information recording pits are formed in a recording layer provided in a land portion between adjacent guide grooves with the application of a laser beam to the recording layer, is composed of a substrate and a recording layer formed thereon. The substrate includes preformed prepits thereon as preformat information in a space along a track center, which includes flag marks and preformed phase grooves, and the decrease in the output of Rf signals generated by the phase grooves is smaller than a half of the amplitude of Rf signals detected by the presence or absence of the prepits.

1 Claim, 13 Drawing Sheets

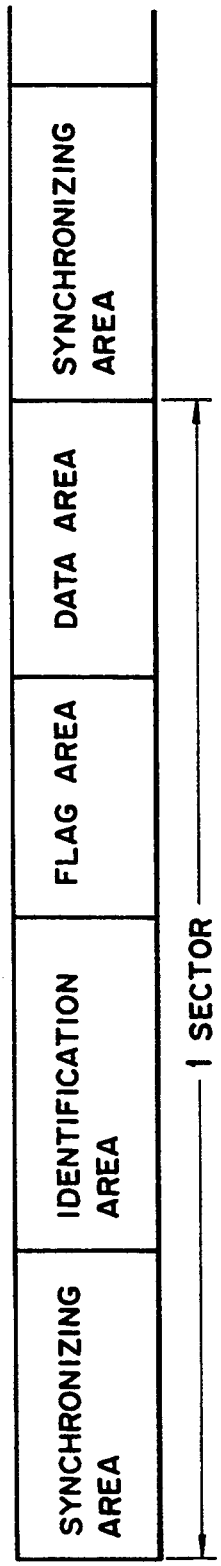
FIG. I(a)
PRIOR ART
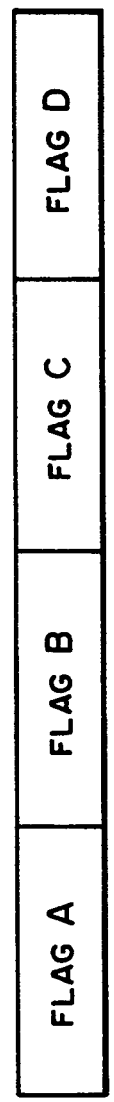
FIG. I(b)
PRIOR ART

Wpq : WIDTH OF PHASE GROOVE

Dpq : DEPTH OF PHASE GROOVE $$\Delta X = \frac{\Delta \ell}{M} \times 100 \quad (\%)$$

OPTICAL INFORMATION RECORDING MEDIUM WITH PHASE GROOVES IN LAND PORTIONS OF INFORMATION RECORDING AREAS

This application is a continuation-in-part of application Ser. No. 07/603,467, filed Oct. 25, 1990, now abandoned.

BACKGROUND OF THE INVENTION

1. Field of the Invention

The present invention relates to an optical information recording medium provided with phase grooves in land portions of information recording areas thereof.

2. Discussion of Background

FIG. 1(a) schematically shows a format structure of a conventional information recording medium, which is composed of a synchronizing area for repeated patterns of reference clocks and for a phase lock loop (PLL) at reproduction, an identification area for registering address numbers at reproduction, and track numbers, a flag area for recording handling information when reproducing recorded information, and a data area for recording the user's data.

The synchronizing area, the identification area, and part of the flag area (except a recording area) are generally called preformat areas, and are preformed in the form of concave portions and convex portions (so-called prepits) in a substrate of an optical information recording medium or disk.

Part of the flag area, which is a recording area, and the data area are for the user's recording areas.

FIG. 1(b) schematically shows the flag area in more detail. The flag area is composed of four flag marks, Flag A area, Flag B, Flag C, and Flag D. These marks are made in the same pattern as shown in FIG. 3(b). Flag A is the mark for indicating that recording has been carried out in the data area. Flag B is the mark for indicating that the data has been verified and judged that there is no good sector. Flag C is the mark for indicating that the sector judged no good has been replaced. Flag D is the mark for indicating that data has been deleted.

Each of these flags serves as a system information when reproducing the information recorded in the data area, so that if any of these four flags is erroneously detected, the recorded data cannot be reproduced correctly.

For instance, when Flag A is erroneously detected, it is judged that no recording has been made in the data area, so that double recording takes place if recording is performed, and it becomes impossible to reproduce a previously recorded information, thus causing a fatal error.

A conventional method for reproducing data, which includes the data in the synchronizing area, identification area, flag area, and data area, will now be explained with reference to FIGS. 2(a) and 2(b).

FIG. 2(a) is a schematic illustration of an optical system for reproducing information from an optical information recording disk. A laser beam emitted from a photodiode 1 is changed to parallel laser rays by a collimator lens 2 and is then caused to pass through a $\lambda/2$ letardation plate 3 for adjusting a plane of polarization, a polarizing beam splitter (PBS) 4, a $\lambda/4$ letardation plate 5 for shifting the plane of polarization by $\lambda/4$, a pickup 6 for focusing the laser beam on a recording surface of an optical information recording disk 7 and having the laser beam track the guide grooves formed on the recording surface of the optical information recording disk 7. The laser beam reflected by the recording surface is again caused to pass through the pickup 6 and the $\lambda/4$ letardation plate 5, is then reflected by the polarizing beam splitter 4, and is then caused to pass through a cylindrical lens 8 for detecting a focus error signal by the astigmatism method, and enters a four-divided photodetector 9. Each signal detected by the four-divided photodetector 9 is converted into a current-voltage signal, and is then amplified so as to have an appropriate voltage by a system as shown in FIG. 2(b). The four signals from the four-divided photodetector 9 are added, so that an Rf signal is produced. The thus produced Rf signal is for detecting the changes in the quantity of the light reflected in accordance with the information on the recording surface, including prepits formed on the substrate of the optical information recording disk 7, and recording pits formed in the recording layer of the optical information recording disk 7 by the application of the laser beam thereto. The Rf signal is then subjected to an AC coupling, and the changes in the direct current level are removed, which include the changes in the quantity of reflected light caused by (a) the changes in the thickness of the recording layer, (b) the focus shifting, which is caused by the warp of the substrate of the optical information recording disk 7, and/or (c) the tracking shift, which is caused by the eccentricity of the optical information recording disk 7. The Rf signal is then converted into a binary digital signal by a zero-level slicer. By decoding the binary digital signal, a zero (0) or one (1) information can be obtained.

A method for detecting flag marks in a land recording method will now be explained with reference to FIG. 3(a), FIG. 3(b), and FIG. 3(c). FIG. 3(a) shows the state of no flag marks having been recorded. FIG. 3(b) shows the state of flag marks having been recorded and therefore being normally detectable. FIG. 3(c) shows the state of flag marks having been recorded, but having been erroneously detected.

In this land recording method, prepits and recording pits are formed in a portion called "land" between adjacent guide grooves which are preformed in a substrate of an optical information recording disk. The prepits and recording pits are situated in the central position between the adjacent guide grooves, which is the so-called track center. A laser beam for reproduction tracks the track center, whereby information recorded in the optical information recording disk can be reproduced.

FIG. 7 is a schematic partial perspective view of the above-mentioned convertional optical information recording disk, showing the geometrical relationship between the guide grooves, and prepits and recording pits which are formed along the track center thereof.

In FIG. 7, reference numeral 10 indicates the substrate of the optical information recording disk; reference numeral 11, a recording layer of the optical information recording disk; reference numeral 12, the guide groove which is preformed in the substrate 10; reference numeral 13, the prepit, which is also preformed in the substrate 10; reference numeral 14, the recording pit which is formed in the recording layer 11 provided on the substrate 10; and reference numeral 15, the track center along which the prepits 13 and the recording pits 14 are situated.

FIG. 3(a) shows the relationship between the prepits and the Rf signals thereof. More specifically, FIG. 3(a) indicates that the level of the Rf signal is shifted to a lower side below a slice level in each portion corresponding to the area in which the prepit is formed, while the level of the Rf signal is shifted to an upper side above the slice level in each portion corresponding to the area between the prepits where there are no prepits.

This is because the quantity of the light which is reflected by the recording layer and enters the photodetector is decreased by the diffraction by the prepits. The slice level for converting the Rf signal into a binary digital signal corresponds to a zero level (GND) when the Rf signal is subjected to AC coupling. This zero level is situated substantially at the center of the amplitude (peak to peak) of the Rf signal which is detected from the presence or absence of the prepits.

FIG. 5(a) shows the relationship between the Rf signal and the binary signal. The binary signal is high in the portion where the prepit is present, and low in the portion corresponding to the space between the prepits where there are no prepits.

FIG. 3(b) shows the relationship among the prepits, the recording pits (flag marks) and the Rf signal in the case where flag marks are normally recorded. Flag marks are recorded in the space between the prepits. The flag marks are also converted into binary signals in the same manner as in the case of the prepits by the reproduction system shown in FIG. 2. This slice level is also situated substantially at the center of the amplitude (peak to peak) of the Rf signals of the prepits. In the case of FIG. 3(b) in which the flag marks are normally recorded, since the pit level of the Rf signal of the flag mark is below the slice level, the flag mark can be normally detected as shown in FIG. 5(b).

The shortcomings of the conventional reproduction method, however, has the following shortcomings, which will now be explained with reference to FIG. 3(c) and FIG. 5(c).

FIG. 3(c) shows the case where the formation of recording pits is insufficient. It is considered that such insufficient formation of recording pits is caused by the decrease of a laser power during recording because of (1) the deterioration of a laser diode employed, (2) the recording under a defocused condition because of the deformation of an optical information recording disk employed, and/or (3) the presence of dust on the surface of the substrate of the optical information recording disk on the opposite side to the recording surface thereof (the recording is usually conducted by the application of a laser beam to the substrate side of the recording disk).

The size of a flag mark recorded under the above-mentioned abnormal conditions is smaller than the size of a normally recorded flag mark, so that the amplitude (B) of the Rf signal for the abnormally recorded flag mark is smaller than the amplitude (A) of the Rf signal for the normally recorded flag mark, that is, B<A. In the case of FIG. 3(c), the pit level of the Rf signal for the flag mark does not reach the slice level, so that the flag mark does not appear as a binary signal as indicated in FIG. 5(c). As a result, even though the flag mark has been recorded, the flag mark cannot be detected.

Thus, in the conventional reproduction method, there is the risk that flag marks are erroneously detected, and if the flag marks are erroneously detected, the data registered by the user may be destroyed, and the data area cannot be handled during the reproduction thereof, so that correct reproduction of recorded data may accordingly become impossible.

SUMMARY OF THE INVENTION

It is therefore an object of the present invention to provide an optical information recording medium or disk from which the above-mentioned shortcomings of the conventional optical information recording medium have been eliminated, and which allows secure detection of recorded flag marks, and therefore is capable of reproducing recorded data securely.

The above object of the present invention can be achieved by an optical information recording medium for a land recording method in which information recording pits are formed in a recording layer provided in a land portion between adjacent guide grooves with the application of a laser beam to the recording layer, comprising a substrate and a recording layer formed thereon, said substrate comprising preformed prepits thereon as preformat information in a space along a track center, which includes flag marks, and preformed phase grooves, the decrease in the output of an Rf signal generated by the phase grooves being smaller than a half of the amplitude of Rf signals detected by the presence or absence of the prepits.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1(a) is a schematic illustration of a format structure of a conventional information recording medium.

FIG. 1(b) is a schematic illustration of a flag area in the conventional information recording medium.

DESCRIPTION OF THE PREFERRED EMBODIMENTS

Figure 8:
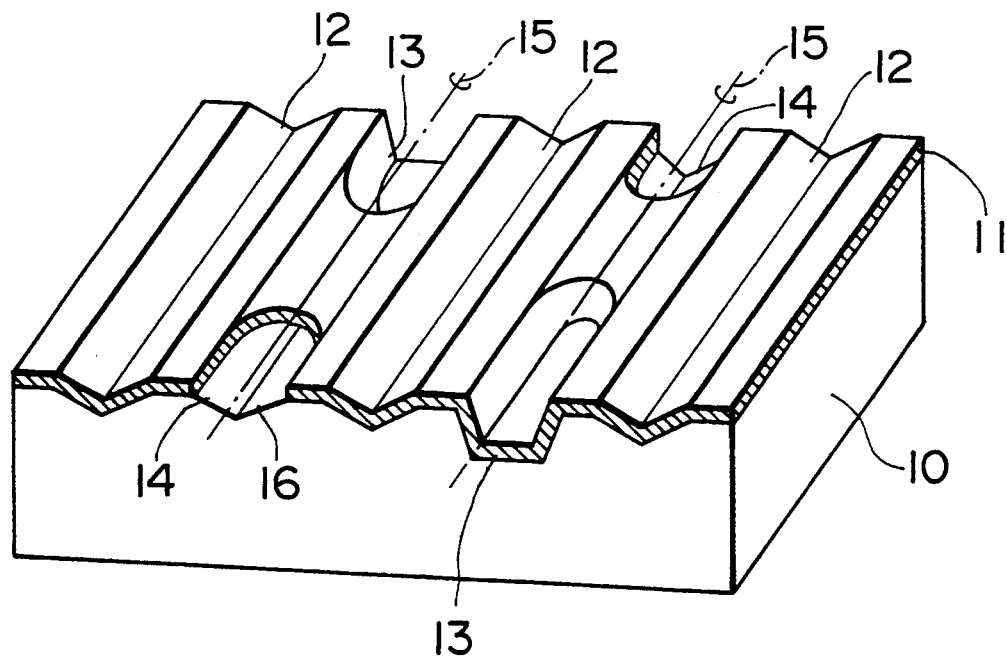
FIG. 8 is a schematic partial perspective view optical information recording medium of the present invention, particularly showing the geometrical relationship among the guide grooves, prepits, recording pits, and phase grooves thereof.

With reference to FIG. 8, an optical information recording medium according to the present invention comprises a substrate 10 and a recording layer 11 formed thereon. The substrate 10 comprises preformed guide grooves 12 for tracking, preformed prepits 13, and phase grooves 16 in a space in which flag marks are to be recorded. The phase grooves 16 are for securely reproducing the flag marks. The recording layer 11 comprises recording pits to be formed by the application of a laser beam thereto as illustrated in FIG. 8.

Figure 4A:
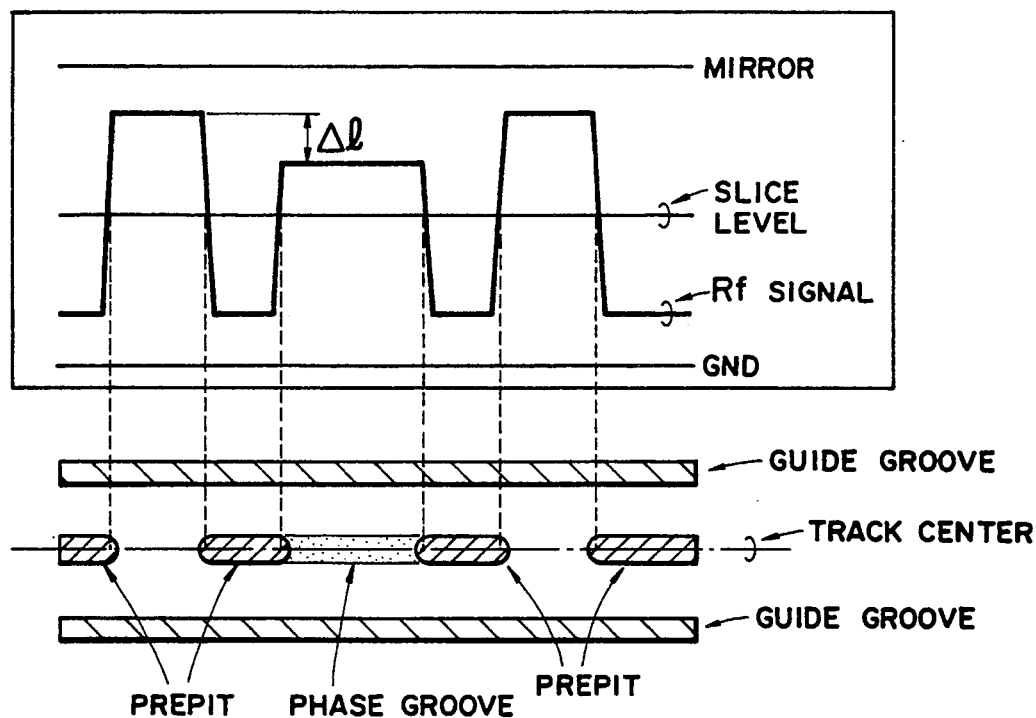
FIG. 4(a) and FIG. 4(b) are diagrams for explaining the effects of a phase groove in the present invention.

The function of the phase groove 16 will now be explained. FIG. 4(a) shows the Rf signal when a phase groove is formed in a space where a flag mark is to be recorded. In FIG. 4(a), the phase groove is indicated by the dot-shaded area. As shown in FIG. 4(a), the pit level of the Rf signal corresponding to the phase groove is lowered by $\Delta l$ in comparison with the pit level of the Rf signal corresponding to a portion where there is no phase groove. The lowering of the pit level of the Rf singnal is caused by the diffraction effect of the phase groove.

Figure 2A:
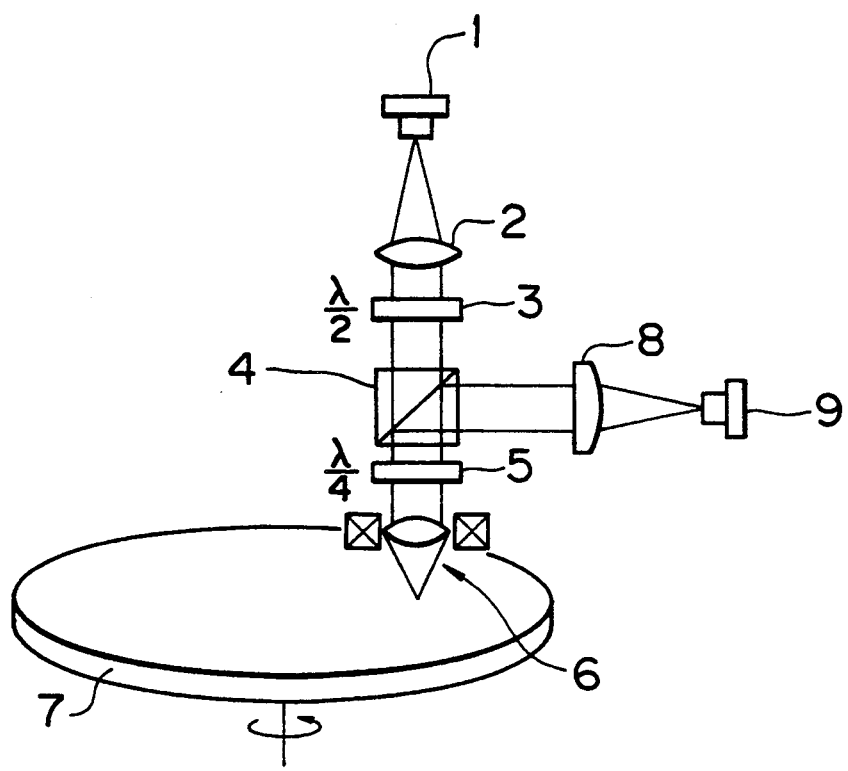
FIG. 2(a) is a schematic illustration of an optical system for reproducing recorded information from an optical information recording disk.
Figure 2B:
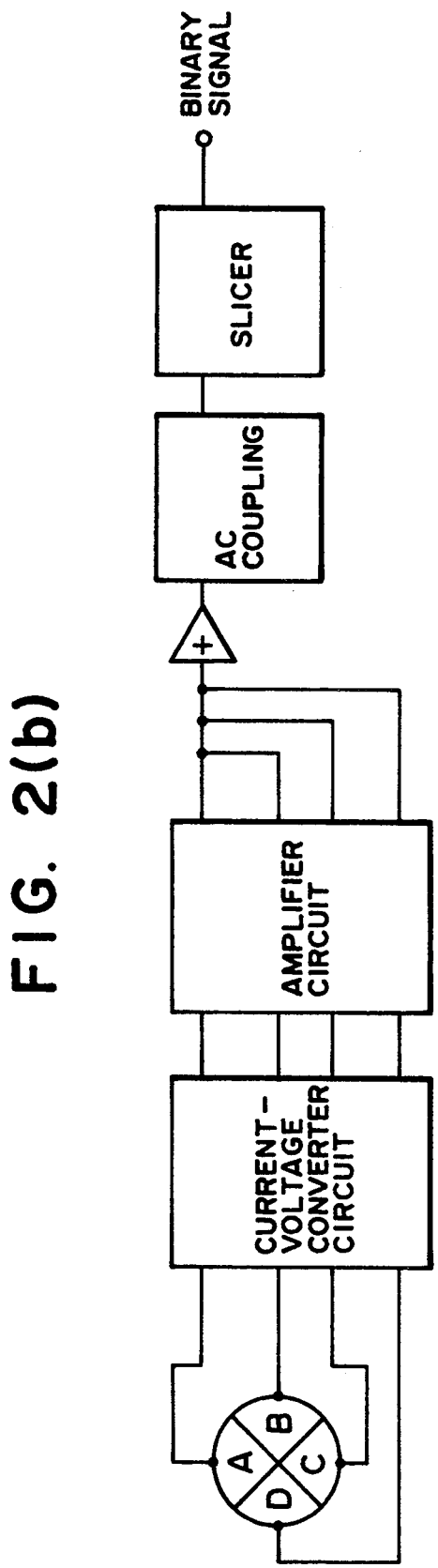
FIG. 2(b) is a diagram of a system including the circuits for converting signals detected by a four-divided photodetector into a binary signal.
Figure 3A:
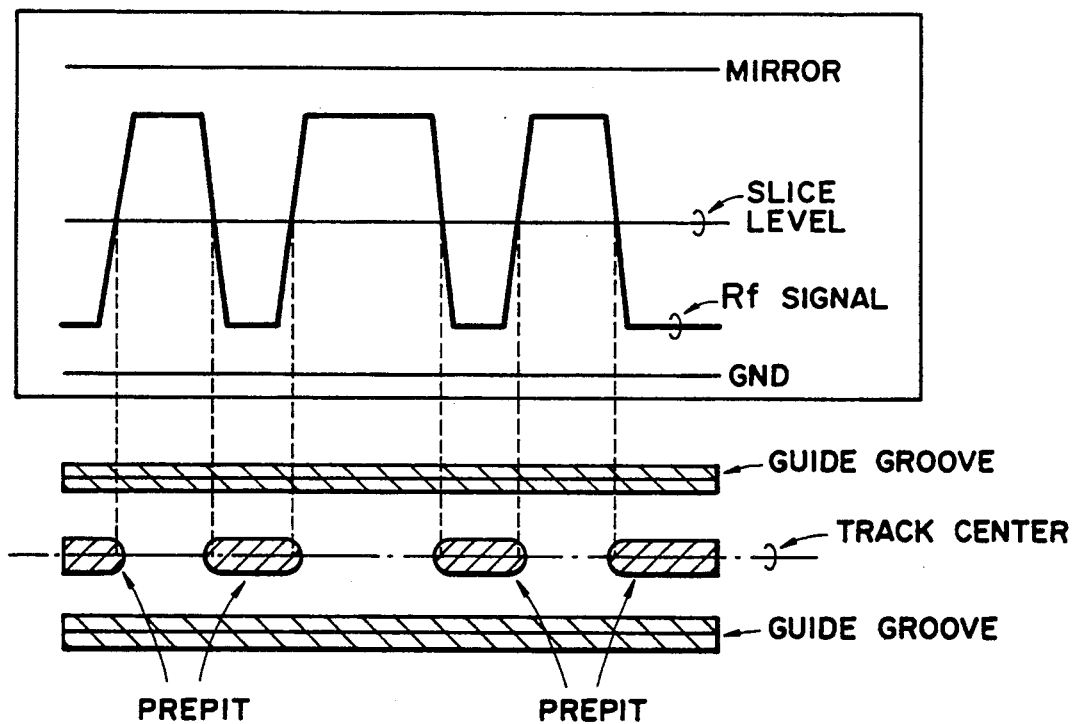
FIG. 3(a) to FIG. 3(c) are diagrams for explaining a method for detecting flag marks in a land recording method.
Figure 3B:
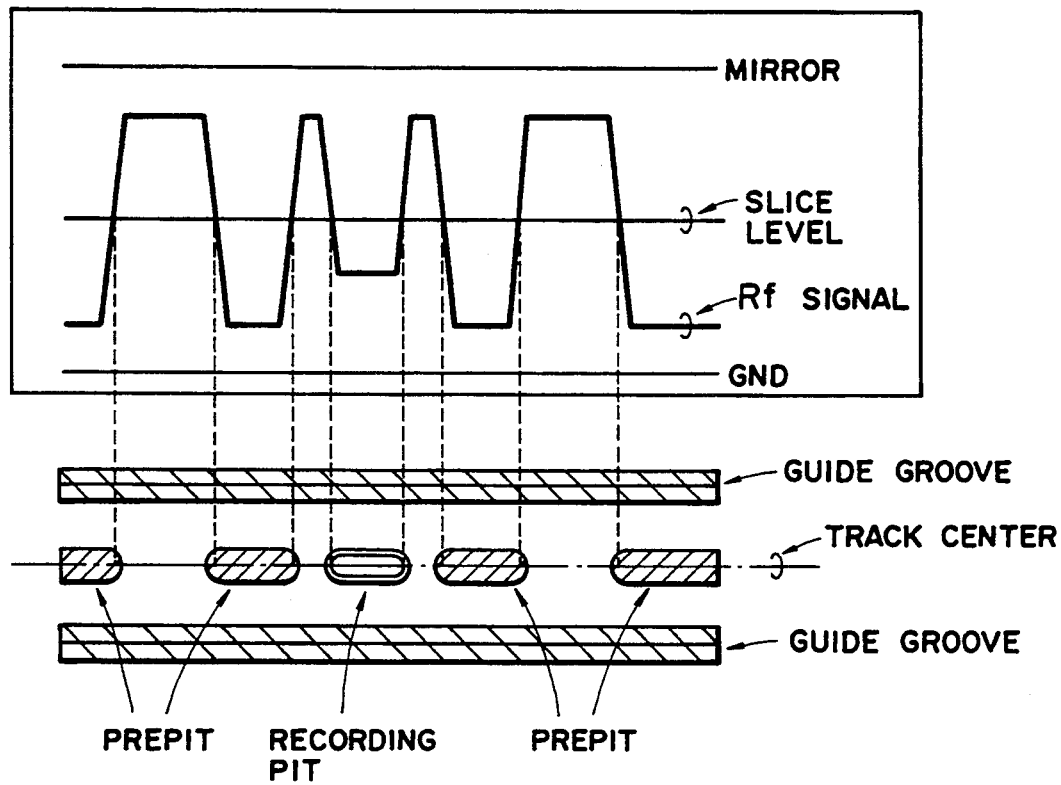
Figure 3C:
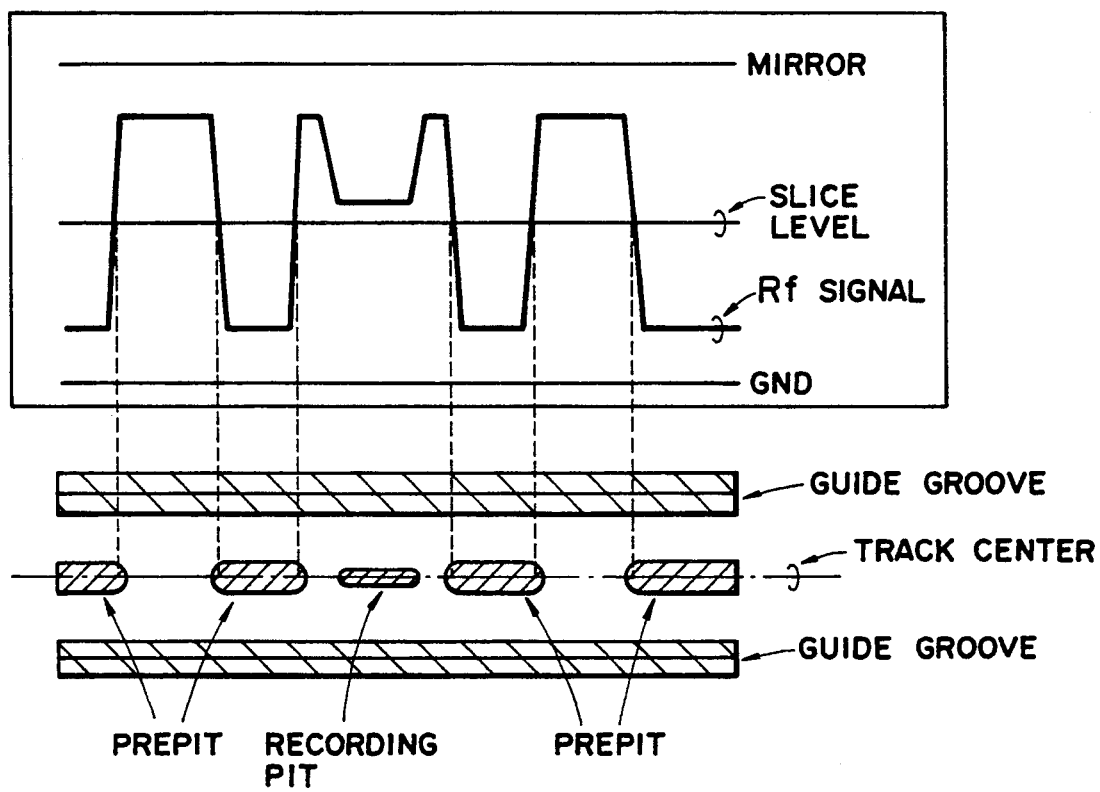
Figure 4B:
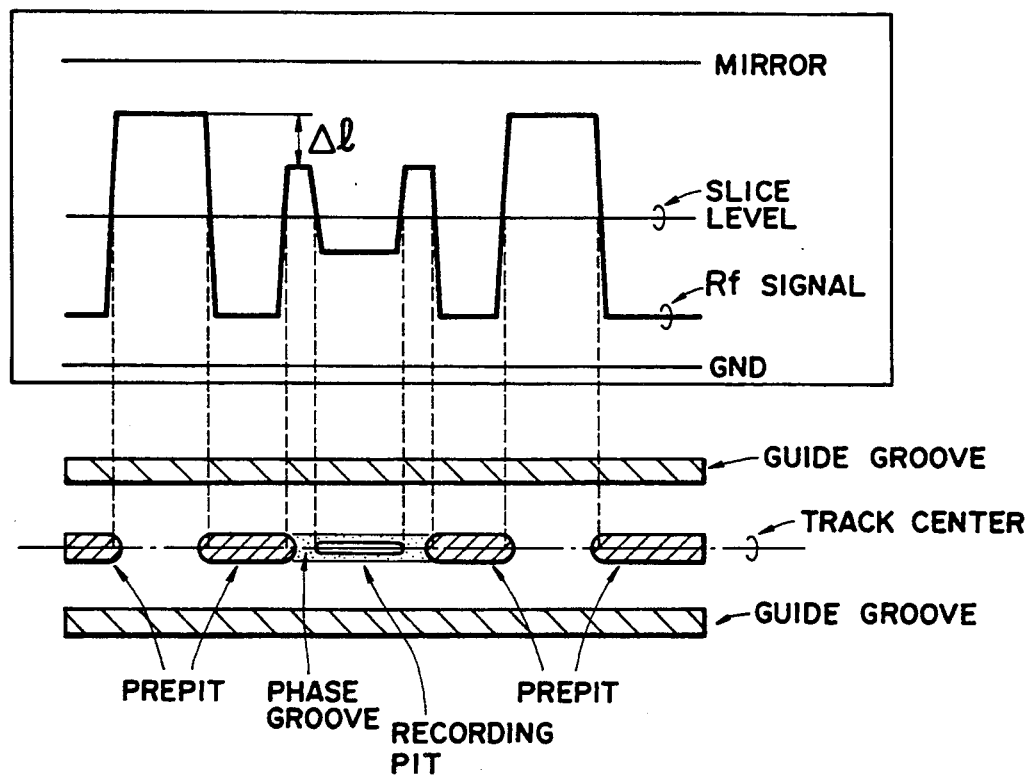
Figure 5A:
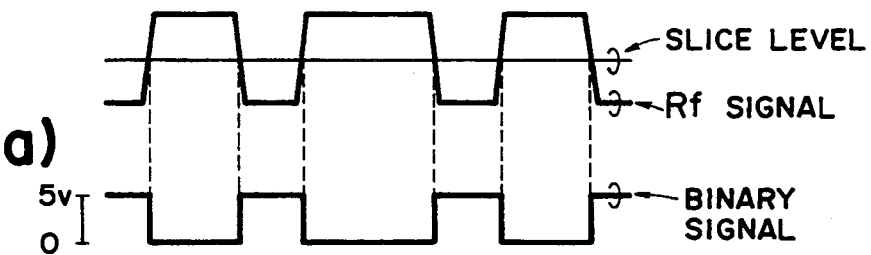
FIG. 5(a) through FIG. 5(c) are diagrams for explaining the relationship among Rf signals, binary signals and the slice level thereof.
Figure 5B:
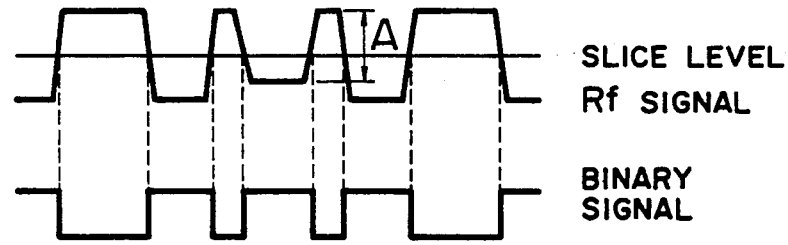
Figure 5C:
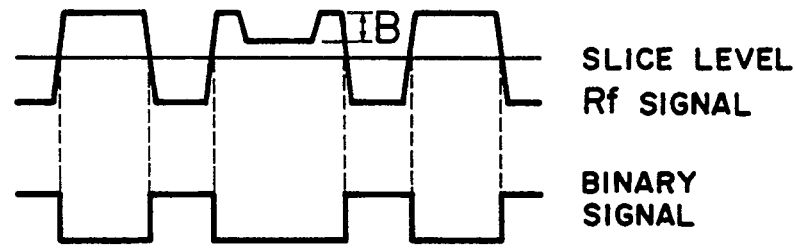
Figure 6A:
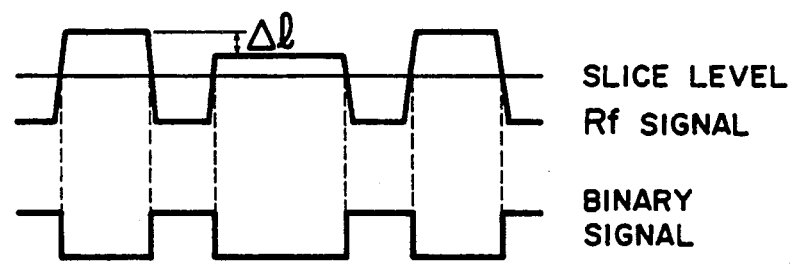
FIG. 6(a) and FIG. 6(b) are diagrams for explaining the relationship among Rf signals, binary signals and the slice level thereof.
Figure 6B:
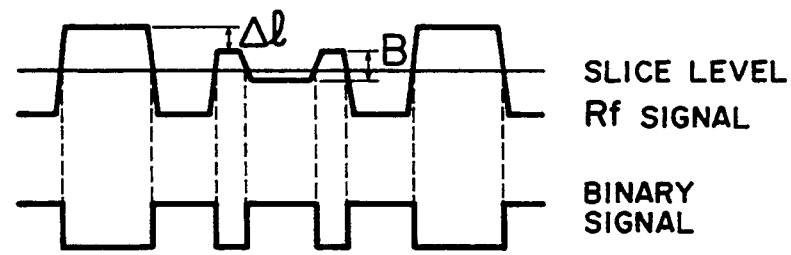
Figure 7:
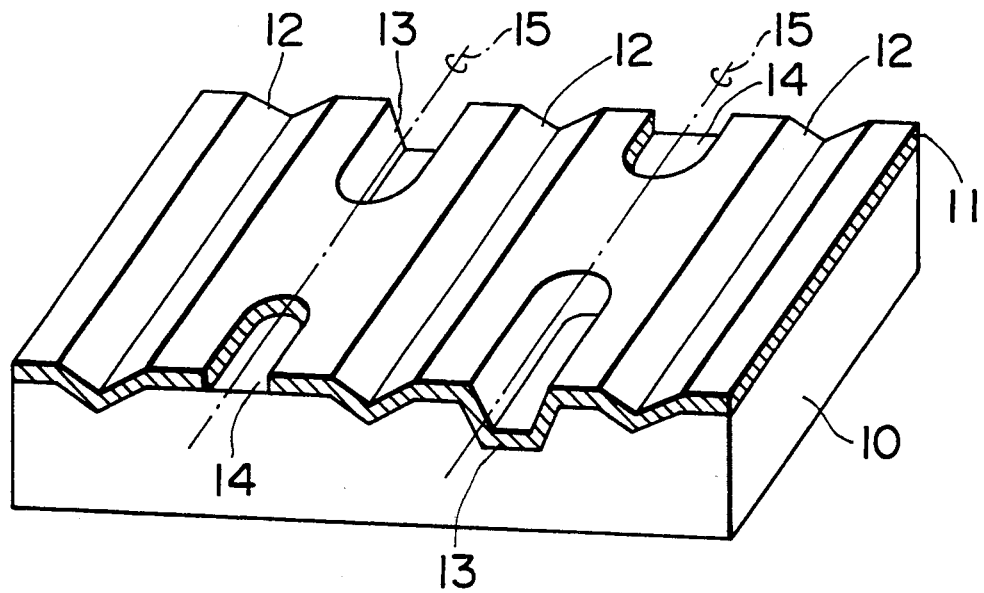
FIG. 7 is a schematic partial perspective view of a conventional optical information recording medium, particularly showing the geometrical relationship among the guide grooves, prepits, and recording pits thereof.

In FIG. 4(b), a flag mark is recorded in the phase groove portion. In this case, it is supposed that the amplitude of the flag mark is the same as the amplitude B in FIG. 3(c), in which the formation of the recording pit is insufficient and the size of the recording pit is small. Even in such a case, the amplitude of the flag mark comes below the slice level, so that the flag mark appears as a binary signal as shown in FIG. 6(b) and therefore can be detected.

When the amplitude of the flag mark is B in the conventional method, the corresponding amplitude appears $\Delta l + B$ in the present invention. Therefore, even if the formation of the recording pits is insufficient, the amplitude $\Delta l + B$ for detecting the flag mark can be obtained in the present invention.

A case to be noted in the present invention is a case where the decrease of the pit level of the Rf signal in a portion where a phase groove is present becomes excesirely large in FIG. 4(a). When the $\Delta l$ becomes so large that the $\Delta l$ reaches the slice level, a flag mark appears as a binary signal even when no flag mark is recorded. The result is that even when nothing is recorded in the data area, the entire sectors of the optical information recording medium are judged as having been used up for recording. Therefore it is necessary that the shape of the phase groove be such that the value of $\Delta l$ does not reach the slice level. In other words, it is necessary that the decrease in the output of an Rf signal generated by the phase groove be smaller than a half of the amplitude of Rf signals generated by the presence or absence of the prepits.

Figure 13:
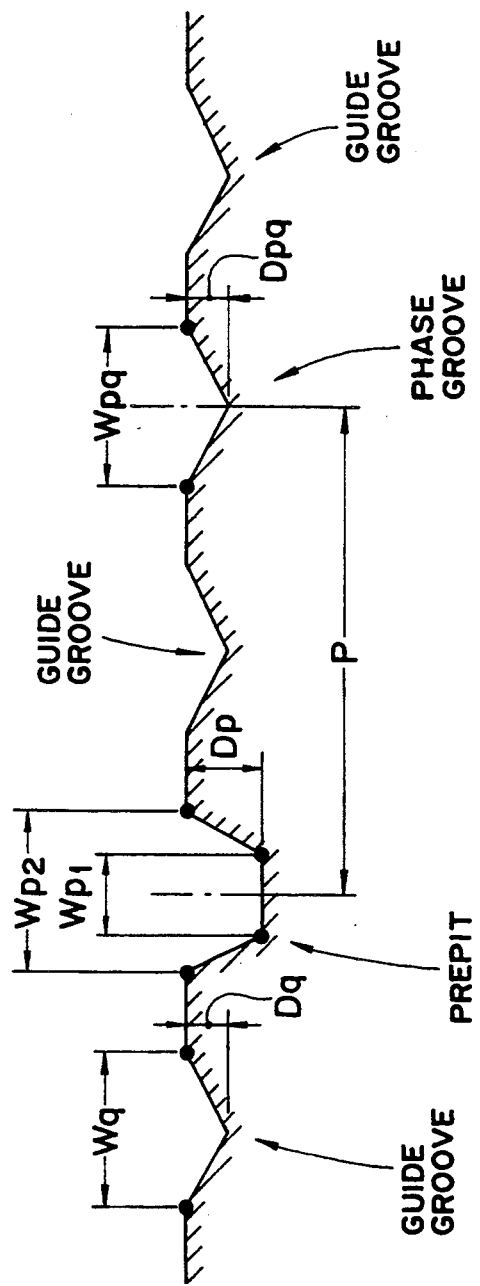
FIG. 13 is a schematic cross sectional view of an optical information recording medium of the present invention, particularly showing the relationship among the width (Wg) and depth (Dg) of the guide groove, and the width (Wp1) of the opening portion and the width (Wp2) of the bottom of the prepit, and the depth (Dp) of the prepit.

An appropriate shape of the phase groove for use in the present invention will now be explained. FIG. 13 shows a schematic cross sectional view of an optical information recording medium of the present invention.

In the optical information recording medium of the present invention shown in FIG. 13, in which Wg is the width of the guide groove, Dg is the depth of the guide groove, Wp1 is the width of the opening portion of the prepit, Wp2 is the width of the bottom of the prepit, and Dp is the depth of the prepit.

Figure 12A:
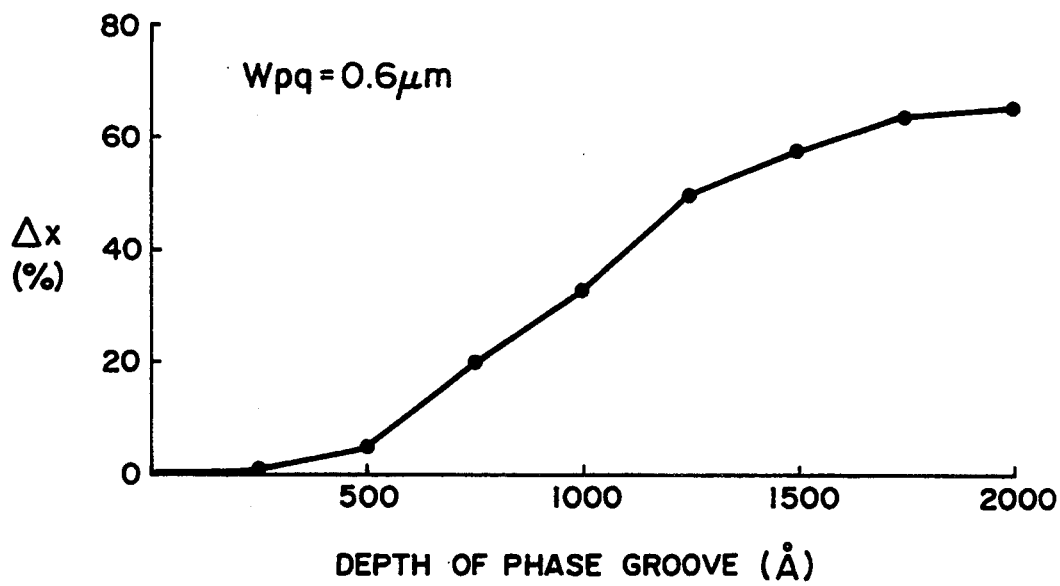
FIG. 12(a) is a graph showing the relationship between the depth of a phase groove and the decrease of an Rf signal thereof.
Figure 12B:
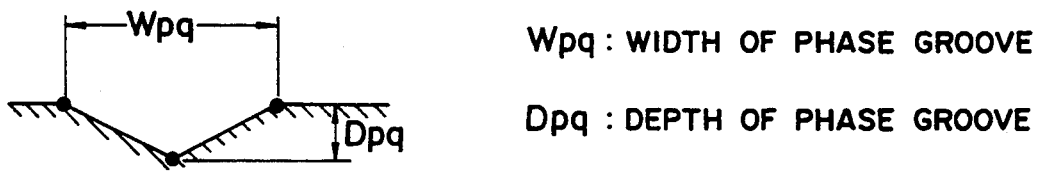
FIG. 12(b) is a schematic cross sectional view of a phase groove.

The vertical cross section of the phase groove shown in FIG. 12(b) is V-shaped. The vertical cross section of the phase groove is defined by the width (Wpg) and the depth (Dpg) of the groove.

The decrease in the Rf signal, $\Delta l$, by the phase groove and the amplitude of the Rf signal, L, by the prepit are defined as follows with reference to FIG. 12(c):

$$\Delta x = \Delta l / M \times 100\%$$

$$x = L / M \times 100\%$$

wherein M is the output value of the Rf signal at a mirror surface. Furthermore, in the above, the wavelength ($\lambda$) of a laser beam employed for reproduction is 780 nm, and the NA of an objective employed is 0.5.

As mentioned previously, it is necessary that the decrease in the output of the Rf signal caused by the presence of the phase groove be smaller than a half of the amplitude of the Rf signal of the prepit. In other words, when the decrease in the output of the Rf signal by the phase groove is $\Delta x$, and the amplitude of the Rf signal of the prepit is x, $\Delta x < (\frac{1}{2})x$. Otherwise, even when nothing is recorded in the data area and accordingly no flag marks are recorded, a flag mark is erroneously detected as being a binary signal, so that the entire sectors of the optical information recording medium are judged as being used up.

This is because the slice level for obtaining the binary signal is positioned substantially at the center of the amplitude of the Rf signal of the prepit.

With reference to FIG. 12(a), when the width (Wpg) of the phase groove is 0.6 μm, an appropriate depth of the phase groove, Dpg, is less than about 1000 Å.

EXAMPLE

Preparation of Stamper

A stamper for molding a substrate for an optical information disk by injection molding for use in the present invention was prepared in accordance with the steps shown in FIG. 9(a) through FIG. 9(f).

Figure 9A:
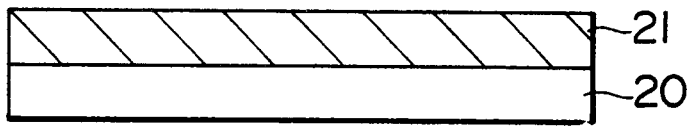
FIG. 9(a) through FIG. 9(f) are diagrams for explaining a process for making a stamper for producing a substrate for an optical information recording disk or medium of the present invention.

In the step shown in FIG. 9(a), a photoresist 21 was coated on a glass substrate 20 by spin coating under the following conditions:

Photoresist: Positive photoresist (commercially available under the trademark "OFPR 800" from Tokyo Ohka Kogyo Co., Ltd.) with a viscosity of 2 cP.

Spin Coating: First rotation at 150 rpm for 20 sec. Second rotation at 350 rpm for 180 sec.

The coated photoresist 21 was pre-baked at 90° for 30 minutes, whereby a photoresist film layer 22 with a thickness of 2600 Å was provided on the glass substrate 20, whereby an original photoresist plate 23 was fabricated.

Figure 10:
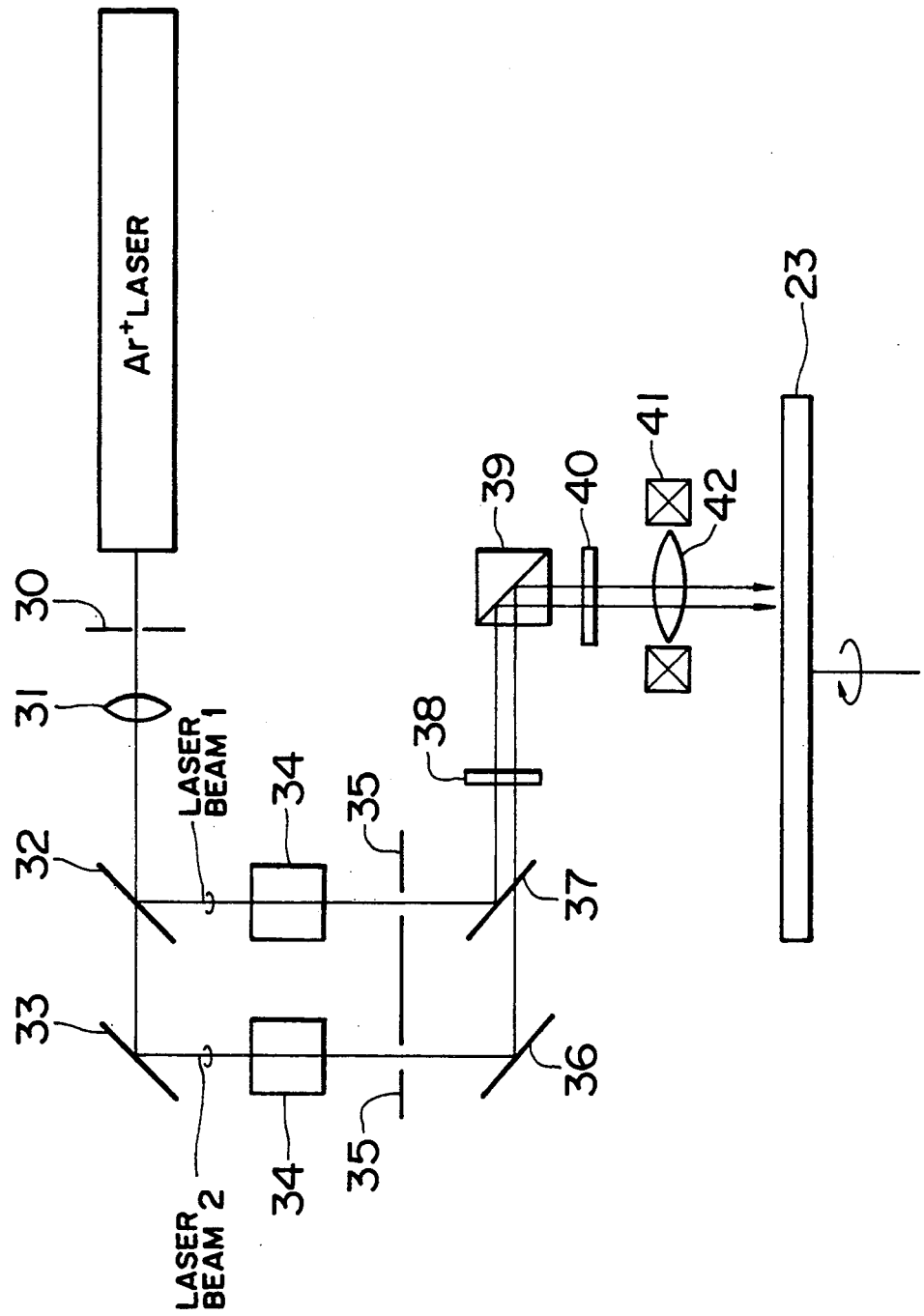
FIG. 10 is a schematic diagram of an original plate exposure apparatus.

The thus fabricated original photoresist plate 23 was exposed to laser beams to form therein latent images for each groove in a spiral form at a constant line velocity by an original plate exposing apparatus as illustrated in FIG. 10.

The original plate exposing apparatus shown in FIG. is capable of applying two laser beam 1 and 2. The laser beam 1 is for forming guide grooves, and the laser beam 2 is for forming prepits and phase grooves in the original photoresist plate 23. Since the laser beam 2 is for forming the prepits and phase grooves which are different in shape, the quantity of light of the laser beam 2 when forming the prepits is different from that when forming the phase grooves. The switching of the quantity of light of the laser beam 2 is performed by light quantity modulators 34.

In FIG. 10, reference numeral 30 indicates a slit; reference numeral 31, a collimator lens; reference numeral 32, a half mirror; reference numeral 33, a mirror; reference numeral 34, a light quantity modulator; reference numeral 35, a slit; reference numeral 36, a mirror; reference numeral 37, a half mirror; reference numeral 38, a λ/2 letardation plate; reference numeral 39, a polarizing beam splitter; reference numeral 40, a λ/4 letardation plate; reference numeral 41, an actuator; reference numeral 42, an objective; and reference numeral 23, the original photoresist plate.

Figure 11A:
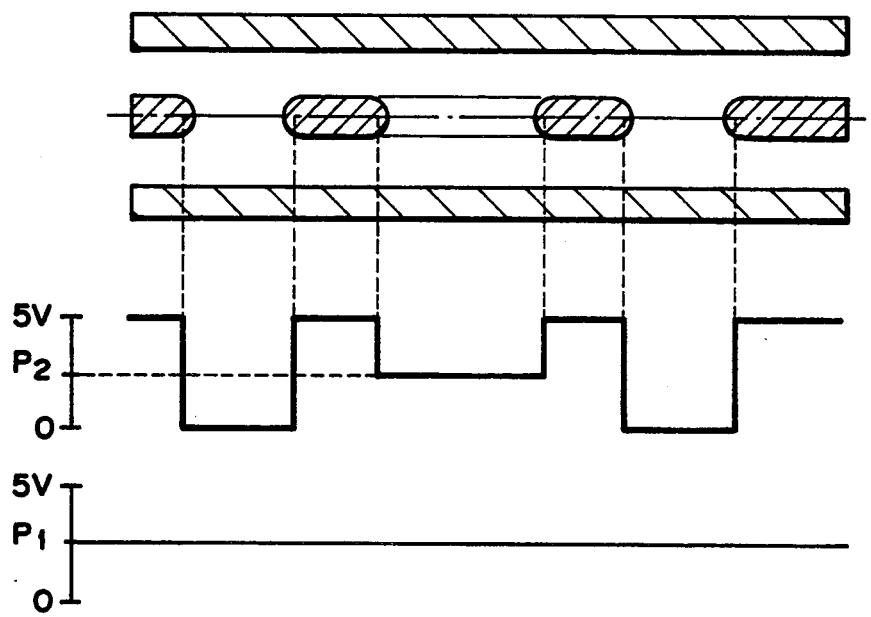
FIG. 11(a) is a diagram for showing the changes in the input voltage applied to an light quantity modulator for adjusting the quantity of light of a laser beam 1 and that of a laser beam 2.
Figure 11B:
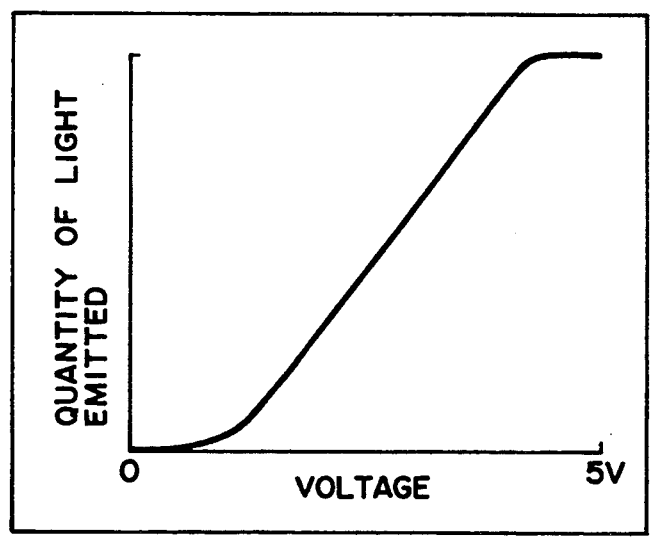
FIG. 11(b) is a graph showing the relationship between the input voltage to the light quantity modulator and the quantity of light output from the light quantity modulator.

FIG. 11(b) shows the relationship between an input voltage to the light quantity modulator 34 and the quantity of the light output from the light quantity modulator 34. The relationship indicated in FIG. 11(b) indicates that the light quantity for the exposure can be changed by changing the input voltage to the light quantity modulator 34.

FIG. 11(a) shows the changes in the input voltage applied to the light quantity modulator 34 for adjusting the quantity of light for the laser beam 1 and for the laser beam 2. The exposure by the beam 1 must be constant in order to form guide grooves with a predetermined cross section in the entirety of the surface of the optical information recording disk. On the other hand, the voltage applied to the light quantity modulator 34 for the laser beam 1 is fixed at P1, while the exposure by the laser beam 2 for forming the prepits and phase grooves is changed in accordance with the patterns thereof.

The input voltage for forming the prepits is set, for example, at 5 V, the input voltage for the data area is set at zero, and the input voltage for forming phase grooves is set at P2 (V), which is changed, whereby the shape of each phase groove can be changed.

In this Example, the width (Wg) and depth (Dg) of the guide groove, and the width (Wp1) of the opening portion and the width (Wp2) of the bottom of the prepit, and the depth (Dp) of the prepit were respectively set, as follows:

Wg=0.5 to 0.6 μm
Dg=1100 to 1300 Å
Wp1=0.1 to 0.2 μm
Wp2=0.5 to 0.6 μm
Dp=2500 to 2600 Å.

Figure 12C:
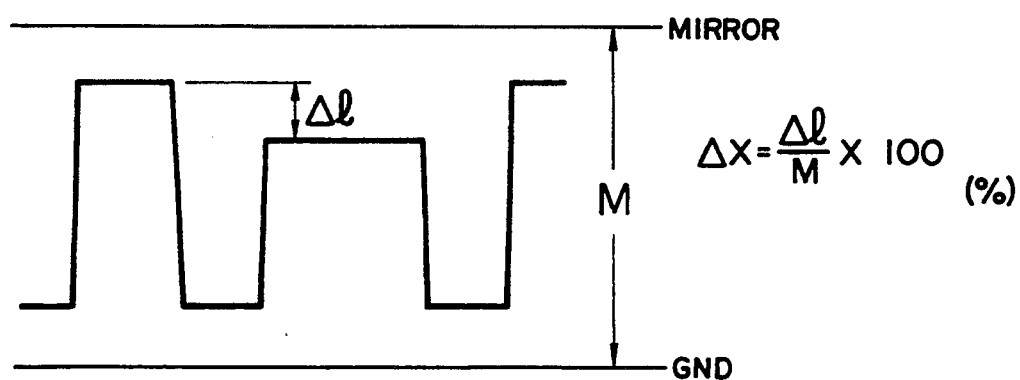
FIG. 12(c) is a diagram for explaining the definition of the decrease of the Rf signal, $\Delta l$, by the phase groove.

In the above case, the value Δx shown in FIG. 12(c) is in the range of 60 to 70%.

Further in this example, the width (Wpg) of the phase groove was set in the range of 0.5 to 0.6 μm, and the depth (Dpg) of the phase groove was set in the range of 700 to 800 Å.

The conditions for applying laser beams to the original photoresist plate 23 were as follows:

Laser beam 1 for forming the guide grooves was applied with a power of 3.2 mW, and laser beam 2 was applied with a power of 5.2 mW for forming the prepits, and with a power of 2.8 mW for forming the phase grooves.

Figure 9B:
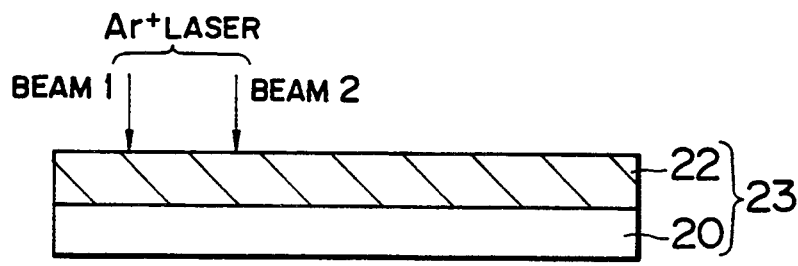

After the above exposure process for forming latent images for the guide grooves, prepits and phase grooves in FIG. 9(b), the latent images were developed with a developer with a dilution of 33% (commercially available under the trademark "DE-3" from Tokyo Ohka Kogyo Co., Ltd.) by spin coating at 150 rpm for 60 seconds, followed by rinsing at 150 rpm for 180 seconds.

Figure 9C:
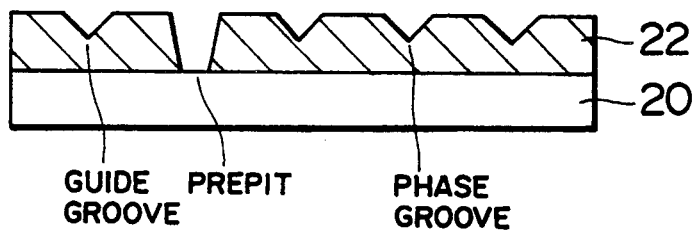

In the above development process, the latent image portions were lifted off so that a pattern corresponding to each of the guide grooves, prepits and phase grooves was formed in the photoresist, whereby a photoresist plate was formed. The thus formed photoresist plate was then subjected to a post baking at 130° C. for 1 hour, so that a photoresist plate having the same shape as that of the substrate for an optical information recording medium of the present invention, as shown in FIG. 9(c), was obtained. As shown in FIG. 9(c), in the baked photoresist film layer 22, the guide grooves, prepits and phase grooves were formed.

Figure 9D:
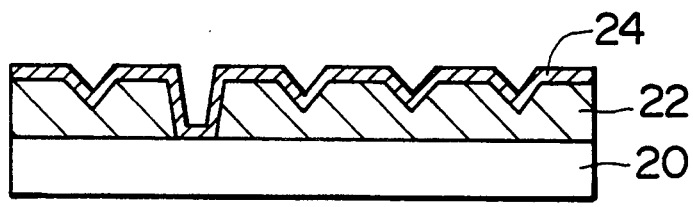
Figure 9E:
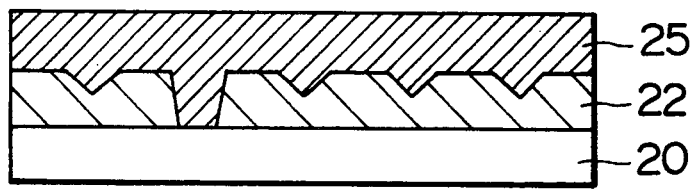
Figure 9F:
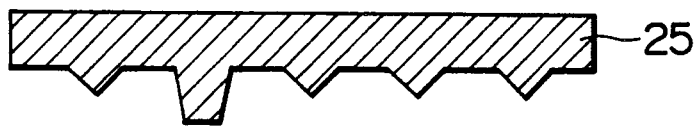

Ni was deposited on the baked photoresist film layer 22 by sputtering to provide a Ni film layer 24 serving as an electroconductive layer as illustrated in FIG. 9(d). The thus Ni film deposited photoresist plate was subjected to electroforming to form a nickel stamper archetype 25 on the photoresist film layer 22 as illustrated in FIG. 9(e).

The nickel stamper archetype 25 was removed from the backed photoresist film layer 22, whereby a stamper was made, having concave portions and convex portions reversely corresponding to the guide grooves, prepits and phase grooves in a substrate of an optical information recording medium of the present invention to be formed.

A substrate made of polycarbonate for an optical information recording disk according to the present invention was molded by use of the above-mentioned stamper by injection molding.

A recording material comprising a cyanine pigment was coated on the above prepared substrate by spin coating to form a recording layer on the substrate, whereby an optical information recording disk was fabricated.

Another optical information recording disk was also fabricated in the same manner as mentioned above. The thus prepared pair of the optical information disks were superimposed in such a fashion that the two recording layers face each other with a spacer interposed therebetween, whereby an optical information disk of the present invention was fabricated.

In order to demonstrate the advantages of the optical information recording disk with the phase grooves of the present invention over a conventional optical information recording medium without the phase grooves, the two optical information recording disks were compared with respect to the laser power for recording (record power) to detect flag marks. The result was that a minimum record power for detecting the flag marks of the optical information recording disk of the present invention was 2.5 mW, while a minimum record power for detecting the flag marks of the conventional optical information recording disk was 3.5 mW.

The difference of 1.0 mW in the record power is significant because a margin with respect to the deterioration of a laser diode, and the deformation and eccentricity of the substrate of the optical information recording disk, which cause the erroneous detection of the flag marks, is remarkably increased when designing and producing the optical information recording disk.

According to the present invention, an optical information recording medium with the considerably increased design margin, can be obtained, which has high reliability in use for an extended period of time, in particular with the changes in the ambient temperature and humidity because of the increased margin with respect to the deformation of the substrate.

What is claimed is:

1. An optical information recording medium for a land recording method in which information recording pits are formed in a recording layer provided in a land portion between adjacent guide grooves with the application of a laser beam to the recording layer, comprising a substrate and a recording layer formed thereon, said substrate comprising preformed prepits thereon as preformat information in a space along a track center, which includes flag marks, and preformed phase grooves, the decrease in the output of Rf signals generated by said phase grooves being smaller than a half of the amplitude of Rf signals detected by the presence or absence of said prepits.

* * * * *